Nov. 5, 1968   H. D. ROE   3,409,314
PIPE COUPLINGS
Filed May 27, 1966   2 Sheets-Sheet 1
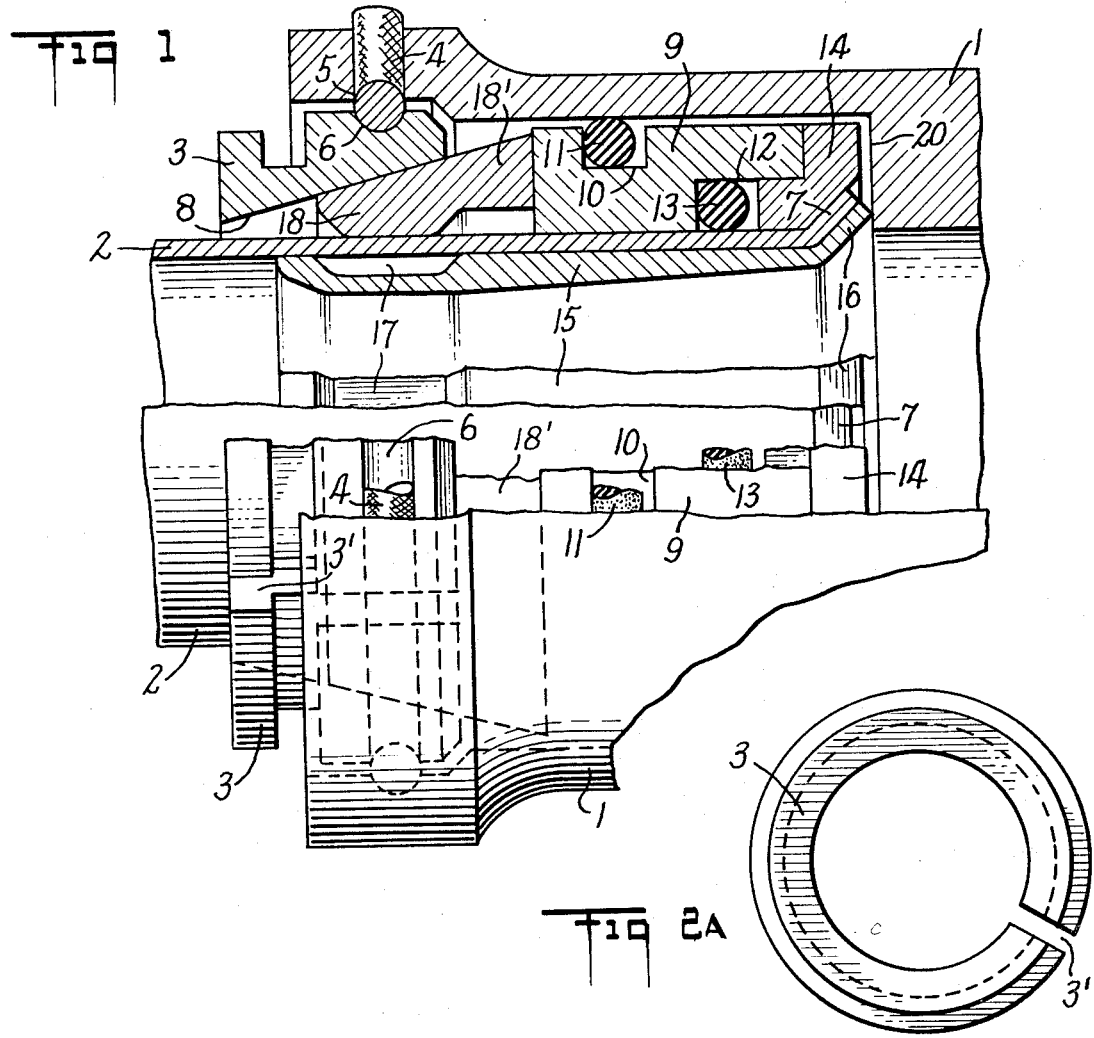
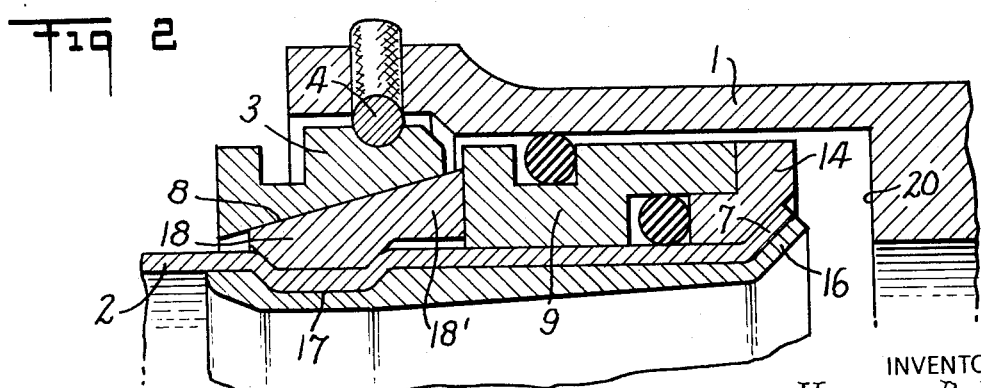
INVENTOR
Homer D. Roe
BY
Curtis, Morris & Safford
ATTORNEYS Nov. 5, 1968  H. D. ROE  3,409,314
PIPE COUPLINGS
Filed May 27, 1966   2 Sheets-Sheet 2
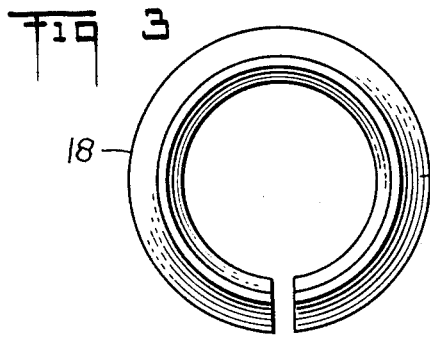
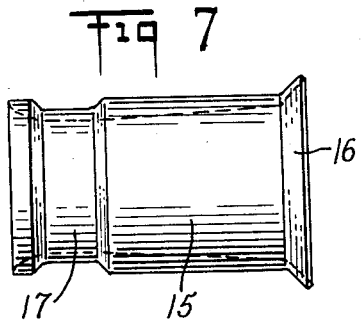
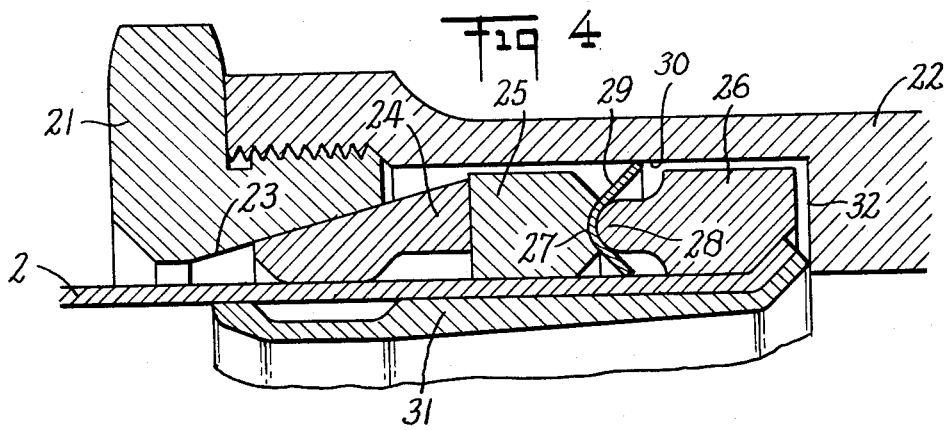
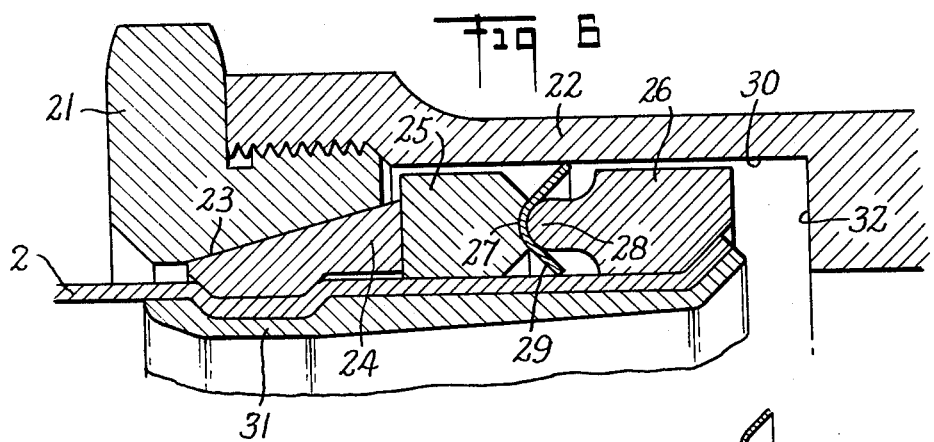
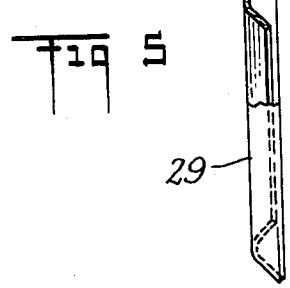

3,409,314
PIPE COUPLINGS
Homer D. Roe, 8 Chapin Place,
Huntington, N.Y. 11743
Filed May 27, 1966, Ser. No. 553,448
1 Claim. (Cl. 285—18)

ABSTRACT OF THE DISCLOSURE

A coupling for use with thin walled light weight or malleable pipe provides a casing, means for securing an end portion of the pipe therein and sealing means between the open pipe end and the casing. A rigid sleeve in the pipe affords a peripherally grooved backing against which a deformed portion of the pipe is held by constricting means between the pipe and the casing. Said means include a split ring wedge having a die part extending into the deformed portion of the pipe to provide in effect a mechanical interlock between the pipe end and the casing thereby to prevent axial separation of the pipe from the casing under extreme internal pressure conditions.

Summary

In general, a coupling which embodies my invention comprises a casing, a retainer ring releasably mounted therein and having a tapered bore, a malleable pipe having an open end portion releasably secured in an open end of the casing coaxially with said retainer ring bore, a sealing ring carrier coaxially positioned in the casing bore and embracing a portion of said pipe, sealing ring means operatively engaged with said carrier and arranged in sealing relation between said casing and said pipe, and means for retaining the pipe end securely in the casing including a relatively rigid sleeve telescoped in the open end portion of the pipe and having a peripheral groove, a split ring tapered wedge operatively engaged in said tapered bore and coaxially interposed between said retainer ring and said sealing ring carrier and having an annular constrictor die arranged and adapted to retain a radially deformed portion of the pipe in constricted clamping relation with said groove in response to internal pressure exerted on said sealing ring carrier thereby to effect constricting operation of the die and to maintain the latter in an interlock between the pipe and the casing to prevent axial displacement of the pipe therein.

The present invention relates to interlocking pipe couplings.

Known types of pipe couplings which perform adequately under commonly met or moderate conditions of use are found to be unacceptable or ineffective in other areas, as where high pressures and/or temperatures are involved, or where special circumstances of use demand the employment of light weight yet extra strong tubing or conduits in the pipe system. These considerations are especially but not exclusively pressing in the airplane industry.

In general, known embodiments of threaded mechanical connector fittings of the flare type commonly used in hydraulic systems range from ¼" to 2" in effective diameter. Where the flared end of a tube or pipe is engaged in such a fitting, the connection is secured by squeezing the flared end of the tube between a 37° or 45° tapered face of the fitting bore and a cooperating retaining nut. The capability of the resulting joint to resist bending and end thrust of the pipe depends in large part on the pipe wall thickness, the angularity of the flare flange and the friction development between the flare, the retaining nut and the fitting bore, which in turn will depend, in part, on the surface characteristics of the engaged parts and the tightness of engagement between the pipe end flare and the retaining nut.

In systems employing such connections, the interengaged parts commonly tend to separate under the impact of internal hydraulic shock and/or external mechanical loads introduced through the pipe; the retaining nut tends to loosen under vibration and/or thermal shock; excessive torque is required to produce effective frictional engagement of the nut on the pipe flare; and reliability in performance demands a high safety factor in respect to pipe characteristics.

In the case of larger diameter fittings, as 4" through 6", for example, bolt flanges are commonly welded to the connected pipe ends and attachment thereof to the connector fitting is by means of tension bolts, strap clamps or the like. These devices, like other attachments for a similar purpose, tend to loosen under pressure and vibration and involve considerable added cost to the systems in which they are employed.

An object of the invention has been to provide a readily installed and releasable or removable coupling of the interlocking type which affords optimum resistance to leakage and to separation from operative position in a conduit, or the like, where the conduit, pipe or tube wall is of relatively light weight or gage.

Other objects are to provide a pipe coupling for use in a high pressure pipe line, for example, which tends to approach optimum leak arresting condition and to more effectively resist separation from coupling conditions under increasing pressures in the piping system; to provide such a coupling effective in conduits employing pipes of larger diameters; to provide a coupling for use in pipe line systems wherein the confined or transmitted fluids are at high temperatures, e.g. such as are likely to impair the sealing effectiveness of sealing rings of organic material, as neoprene, buna, etc., or the like; or where the fluid is of such chemical character as to impair or destroy organic type rings; to provide an effective but readily releasable pipe coupling adaptable for more securely connecting conduit parts or pipes of relatively thin or light weight tubing of malleable or deformable material; or, for connecting conduit parts including tubing of relatively thin but less malleable or more rigid material; to provide a coupling or fitting which can be mechanically attached to thin wall tubing on the job and which in use will withstand separation from such tubing due to internal stresses up to substantially tube bursting pressure; to provide a pipe coupling wherein in use component parts are caused to crimp or deform annular portions of the pipe or tube wall and thereafter to remain interlocked therewith to produce and maintain optimum resistance to loosening or separation of the coupling from the pipe due to vibration or other externally applied loads while maintaining effective sealing between the tube and the casing of the coupling assembly; and to provide a coupling which in use not only produces and maintains said interlocking with deformations in the pipe but also comprises parts capable of being removed for cleaning, repair or the like and of being reassembled and effectively interlocked with the pipe.

In general, my invention may be embodied in a coupling wherein a casing provides an effective fluid transmitting connection between parts of a pipe line, which parts include a tube having an end portion releasably engaged in an open end of the casing, a sealing ring carrier coaxially positioned in the casing bore, sealing ring means operatively engaged with said carrier and arranged in sealing relation between said casing and said tube, means for releasably retaining said carrier in operative position in the casing bore, and wedging means in the casing operatively interposed between said casing and said tube to retain said tube against endwise displacement by internal pressure from operative position in relation to the casing.

Other objects and distinctive features of the invention not above referred to will appear from the following description and appended claims and in the accompanying drawings wherein I have shown illustrative embodiments described in this specification.

FIG. 1 of the drawings is a fragmentary view on exaggerated scale partly in elevation and partly in central longitudinal vertical section illustrating an embodiment of my invention advantageously applicable to high pressure conduit lines employing light weight or thin walled relatively malleable pipe; the operating parts being shown in their relative positions aprpoximately as initially assembled or prior to being subjected to internal pressures of wedge or die actuating magnitude which complete the interlock between the pipe and the rigid backing sleeve and between the pipe end and the casing part of the coupling.

FIG. 2, a view similar to FIG. 1 but showing operating parts in interlocking engagement with wall portions of a pipe line in which the coupling is employed;

FIG. 2a, an end elevation of the outer retainer ring as viewed from its outer end, FIG. 1;

FIG. 3, an end elevation of the collet type annular wedge and male die locking element seen in FIGS. 1 and 2, as viewed from its outer or narrowed end;

FIG. 4, a fragmentary view partly in elevation and partly in central longitudinal section illustrating a modification wherein operating parts including a casing are retained in coupling position on an end portion of a pipe or tube by a threaded retaining member; and a metal sealing ring is employed more particularly where the pipe line transports very hot or chemically reactive fluids, the parts being shown in their relative positions approximately as initially assembled, or prior to being subjected to internal pressures of wedge or die actuating magnitude;

FIG. 5, a fragmentary view illustrating the metal seal shown in FIG. 4;

FIG. 6, a view similar to FIG. 4 but showing operating parts in interlocking engagement with wall portions of a pipe on which the coupling is employed; and FIG. 7 is a detail view in side elevation of the rigid backing sleeve employed in the bore of the tube or pipe as seen in FIGS. 1 and 4.

Referring to the drawings, the embodiment of my invention shown in FIG. 1 includes a casing 1 which may advantageously be tubular and which has a generally cylindrical bore comprising zones or portions of different diameters including an open end chamber or compartment of relatively large diameter. An inner end portion of a thin wall or malleable tube or pipe 2 having a peripheral flange 7 extends through and into the open end zone of said bore where it is releasably secured in operative position in the casing 1 by means including a ring 3 having a tapered bore 8. Sealing ring carrier means are conveniently mounted on end portion of pipe 2. In installations where relatively lower pressure surge conditions are encountered, ring 3 is advantageously provided with a slot 3' which may, however, be omitted where load induced higher pressures and end thrust are developed. Ring 3 may be releasably secured in the open end of the casing bore by suitable means, such as the flexible key 4 removably positioned in a known manner between a groove 5 in the casing and an opposed groove 6 in said ring.

Said sealing ring carrier means is advantageously in the form of an assembly on and coaxial with the pipe and comprising a ring 9 having a peripheral groove 10 which receives sealing ring 11 and an inner end annular cavity 12 which receives sealing ring 13 and is closed by an end ring 14 interposed between and abutting the inner end of ring 9 and flange 7 of pipe 2. Said assembly is in substance shown and described in my copending applications above referred to. It is contemplated that ring 9 and ring 14 will be formed of sufficiently rigid material to withstand seal crushing or deforming pressures in the pipe line, so that, with conventional type seal rings 11 and 13 positioned as shown, they will be protected from axially directed crushing forces while the initial assembly with pipe 2 will be movable axially to a limited extent, in effect as a unit, under sufficiently great pressure in the casing in a manner and for a purpose to be described.

Under some conditions, as where circumstances require the use of light weight but strong tubing, or the like, provision is made according to the present invention for effecting a positive interlock between the casing 1 and the pipe. Where the latter is of malleable or deformable material, the coupling advantageously includes a reinforcing or backing sleeve 15 having a peripheral flange 16 at its inner end and an annular groove 17 toward its outer end. The shape and dimensions of sleeve 15 are such that, when it is operatively positioned in an inner end portion of pipe 2, flange 16 overlaps flange 7 of said pipe; and groove 17 provides an annular recess underlying a surrounding portion of pipe 2. Said groove or recess 17 thus provides in effect the female component of an annular die assembly which includes an annular male die 18, shown as inwardly radially extending portions of a split ring wedge 18' having a tapered outer surface mating with and axially slidable in the tapered bore 8 of retainer 3.

In the case of the FIGS. 1 and 2 embodiment, the coupling is conveniently assembled and applied as follows:

Pipe 2 is formed with flange 7 at one end either in the shop or on the job. In the latter case, retainer 3 and the wedge 18' are initially engaged coaxially on pipe 2, along with the carrier ring 9, sealing ring 11 in groove 10, sealing ring 13, and end ring 14. Flange 7 is now formed by the use of suitable tools in a manner to bear against end ring 14. The backing sleeve 15 is inserted into pipe 2 advantageously through its flanged end to bring flange 16 into overlapping contact with flange 7. The parts so assembled on pipe 2 are inserted into the cylindrical cavity 19 of casing 1 to bring the inner edge of flange 16 to an initial position limited by annular shoulder 20 at the inner end of said cavity 19 and are retained approximately in this initial assembled position, FIG. 1, by ring 3 and the flexible key 4. This arrangement when completed as hereinafter described provides an effective coupling of the pipe and casing which can withstand a wide range of pressure conditions in the piping system depending on many variables.

Thus, in the case of systems carrying fluids under high pressure, i.e. on the order of 2,000 p.s.i., in a 1" fitting, for example, the described coupling capable of operating to produce effective substantially positive, interlocking, as distinguished from interport friction, between the pipe end 2 and casing 1 and cooperating parts can withstand separation of the connected pipe parts under internal pressures up to and beyond pipe bursting pressures.

Accordingly, in a case, for example, where pipe 2 is deformable by reason of its component material and/or wall thickness, and sufficiently high pressure builds up in casing 1, the sealing ring carrier assembly, along with pipe 2 and sleeve 15, is moved axially outwardly in casing 1 (i.e. left FIGS. 1 and 2) against wedge 18' by such internal pressure, thereby forcing said wedge 18' outwardly and moving said male die portion 18 radially inwardly against adjacent portions of the wall of tube 2, which are thus crimped or displaced into groove or die recess 17 of sleeve 15, as seen in FIG. 2. Said axial or linear movement of the parts, indicated in exaggerated degree in the drawings, may be on the order of .15 in.

or such as to ensure effective positioning of die 18 in relation to groove 17.

The effect of said crimping and constricting action is to interlock the pipe 2 and sleeve 15 and to interlock pipe 2 and casing 1. Thus, such a connection remains intact over a wide range of pressures in the piping system and tends to resist loosening by vibration of severe shocks. Also, where the described interlock has been effected and the coupling is later released for cleaning, repair, etc. as by backing out the front end retainer 3, the component parts may readily be returned to operative assembled relation without loss of effective interlock.

In the modification shown in FIG. 4, the front end retainer for the sealing ring assembly comprises a thrust nut 21 threaded into the open end of casing 22 and formed with a tapered annular bore 23. Where pipe 2 is to be interlocked with nut 21 and casing 1, an annular wedge or collet 24 is operatively positioned for axial and radial movement of portions thereof in tapered bore 23, as in the case of the wedge 18', FIGS. 1 and 2. However, wedge 24 is moved outwardly axially by the sealing ring carrier assembly comprising cooperating rings 25 and 26 which embrace inner end portions of pipe 2, the outer transverse face of ring 25 being in abutting relation to the inner transverse face of wedge 24, whereby outwardly directed pressure on ring 25 is transmitted to wedge 24.

The inner transverse face of ring 25 is formed with a groove 27 positioned opposite an annular rib 28 extending forwardly (left FIG. 4) from ring 26 with its ridge portion in effect in mating relation to groove 27, or such that, when a sealing ring as 29, is engaged snugly between said rings 25 and 26, peripheral edge portions thereof are in effective sealing contact with interior portions 30 of the casing bore and with external surface portions of the pipe 2.

As seen in FIG. 5, sealing ring 29 is advantageously of dished transverse sectional contour and formed from a resilient or flexible material. In effect, said ring 29, in operation is clamped in conforming condition between groove 27 and rib 28 with its peripheral edges yieldingly engaged as above noted. In installations where fluid passing through the coupling is at high temperature, as 1,000° F. or more, or is injuriously reactive chemically on organic material, sealing ring 29 may be formed of suitable metal, as stainless steel, and of such dimensions that its periphery is maintainable in effective sealing condition and position when ring 29 is operatively engaged between said groove 27 and said rib 28.

The parts shown in FIGS. 4, 5 and 6 are conveniently assembled on pipe 2 in substantially the manner described in connection with assembly of the FIGS. 1 and 2 embodiment above described. Thus, initially the inner end of the sleeve or female die member 31 is brought into position opposite annular shoulder 32 of cavity 30 where it is retained by thrust nut 21, substantially as seen in FIG. 4. In this condition of the parts, there is a short space, i.e. approximately .15", between the transverse inner end face of nut 21 and the opposed outer end face of ring 25; and the inner end face of wedge 24 bears against said outer end face of ring 25. However, when pressure in the casing 22 is sufficiently increased, it causes rings 25, 26 and 29 to move axially with pipe 2 and sleeve 31 toward the tube crimping position shown in FIG. 6; or such that wedge 24 is forced radially in a direction to deform the underlying wall of pipe 2 so that the parts become interlocked as previously described in connection with FIG. 2. In the FIG. 4, 6 embodiment, the coupling is released by backing off nut 21 sufficiently to permit radial expansion of wedge 23 to bring its male die portions out of locking engagement with the deformations previously impressed in the wall of said pipe 2. With this release of the lock, wedge 24 is slidable axially outwardly thereby unblocking the seal ring carrier assembly for similar sliding movement on pipe 2. It is contemplated that the disassembled parts may be reassembled after repairs or replacements in such manner that the interlocking as above described is reestablished as in the case of the FIG. 1 and FIG. 2 embodiment.

Advantages in the use of my invention as applied to fittings of relatively small diameter are illustrated by comparisons in contemplated performance between a typical flare type connection and a corresponding interlock device embodying the invention, as follows:

|  | Flare Type, 1½" diam. tube (flared) | Interlock Type, 1½" diam. tube (interlock) |
| --- | --- | --- |
| Working pressure | 3,000 p.s.i | Same as flare type. |
| Material | 321 stainless steel | Do. |
| Operating conditions | Considerable shock and mechanical strain. | Do. |
| Recommended safety factor. | 6 | 2½. |
| Recommended tube wall thickness. | .134" | .065". |
| Wt. per ft | 1.95 lbs./ft | .996 lb./ft. |
| Weight saving | 0 lb./ft | .954 lb./ft. |
| Percent wt. saving | 0% | 49%. |
| Cost/ft | $3.56 | $2.25. |
| Cost savings | 0% | Approx. 37%. |

In the above calculations, the advantageous safety factor in respect to the interlock embodiment is permissible because, when operating under high stress or in elevated temperatures, there is no detrimental effect on the sealing devices or on the mechanical connection of the tube to the casing or connector fitting. Sealing remains constantly effective in spite of any relative axial or rotative movement of the internal parts.

Where the fittings are of larger diameter, as 4.0 for example, of 321 stainless steel, with wall thickness of .035", the flare type connection yielded at approximately 450 p.s.i. whereas the interlock will not yield but the tube will burst at approximately 1,485 p.s.i.

In a procedure on ¾" OD, .035 stainless steel tube, the interlock connection survived, with no evidence of leakage or mechanical impairment, a 100,000 cycle impulse test where the applied internal pressure was cycled from 0 to 2,250 p.s.i. at the rate of one cycle per second.

In the case of ¾" and 1" size devices of aluminum or steel, the connections have survived in unimpaired sealing condition pressures up to the point of tube failure by bursting. Similar advantageous durability as well as tolerance of fluid temperatures over 1,000° F. extend to the use of my invention, as embodied in fittings of 4" diameter or larger and of .016" wall thickness.

I claim:

1. A coupling comprising a casing having a substantially cylindrical open end bore, an annular sealing ring carrier positioned within said casing bore, a pipe extending into said bore, said annular sealing ring carrier having a bore therethrough and said pipe extending through said sealing ring carrier bore, a rigid backing sleeve telescoped in the pipe and having a peripheral groove in the outer peripheral surface thereof, sealing ring means on said carrier in operative sealing relation with internal surface portions of the bore of said casing and with external surface portions of said pipe, a retaining ring releasably attached to said casing retaining said pipe coaxially in operative position in said casing, the bore of said retaining ring including a tapered portion of truncated conical contour diminishing in diameter from its inner to its outer end and an annular wedge embracing said pipe and movable axially in said casing and including a radially movable die portion operatively positioned between said pipe and said tapered portion of the bore of said retaining ring and radially alined with said groove, an inner end portion of said wedge being in operative pressure receiving relation to an outer end portion of said sealing ring carrier, said casing, backing sleeve, sealing ring carrier, pipe, retaining ring and wedge and die portion being all so constructed and arranged so that said sealing ring carrier, backing sleeve and wedge and die portion are axially fixed relative to said pipe whereby, when applied pressure from line fluid within said casing bore and pipe bore is exerted axially and outwardly on said carrier and thereby on said wedge, said die portion thereof is stressed radially inwardly by said tapered portion of the retaining ring against opposed peripheral portions of said pipe permanently deforming the pipe into conforming contact with the groove thereby retaining said pipe with said casing bore.

References Cited

UNITED STATES PATENTS

| | | | |
|---|---|---|---|
| 2,017,994 | 11/1935 | Spang | 285—105 |
| 2,466,526 | 4/1949 | Wolfram | 285—104 |
| 2,485,976 | 10/1949 | Main | 285—106 |
| 2,727,761 | 12/1955 | Elliott et al. | 285—105 X |
| 3,097,866 | 7/1963 | Iversen | 285—101 X |
| 3,127,199 | 3/1964 | Roe | 285—165 |
| 3,164,361 | 1/1965 | Pruett | 285—322 X |
| 3,186,740 | 6/1965 | Lee | 285—323 X |

FOREIGN PATENTS

| | | |
|---|---|---|
| 237,391 | 12/1964 | Austria. |
| 985,539 | 3/1951 | France. |
| 1,222,909 | 1/1960 | France. |
| 961,233 | 6/1964 | Great Britain. |
| 235,095 | 3/1945 | Switzerland. |

CARL W. TOMLIN, *Primary Examiner.*

D. W. AROLA, *Assistant Examiner.*